United States Patent [19]

Taniguchi

[11] Patent Number: 5,184,287
[45] Date of Patent: Feb. 2, 1993

[54] CHIP TYPE SOLID ELECTROLYTIC CAPACITOR

[75] Inventor: Hiromichi Taniguchi, Tokyo, Japan
[73] Assignee: NEC Corporation, Tokyo, Japan
[21] Appl. No.: 895,843
[22] Filed: Jun. 9, 1992
[30] Foreign Application Priority Data
Jun. 14, 1991 [JP] Japan .................................. 3-142847
[51] Int. Cl.$^5$ ............................................ H01G 9/00
[52] U.S. Cl. ..................................................... 361/540
[58] Field of Search ................. 361/508, 509, 516–520, 361/528–540, 402

[56] References Cited
U.S. PATENT DOCUMENTS
4,017,773 4/1977 Cheseldine ......................... 361/540
4,675,790 6/1987 De Matos et al. ............... 361/402 X
5,001,023 3/1991 Cheshire et al. ........................ 429/94

*Primary Examiner*—Donald A. Griffin
*Attorney, Agent, or Firm*—Leydig, Voit & Mayer

[57] ABSTRACT

According to this invention, a chip type solid electrolytic capacitor includes a capacitor element, an insulating sheathing resin layer, two anode terminals, and a cathode terminal. The capacitor element is obtained by sequentially forming an oxide film, a solid electrolytic layer, and a cathode conductive layer on an anode body consisting of a valve metal in which anode leads are extracted from two opposite end faces. The insulating sheathing resin layer is coated on an entire outer surface except for both anode lead extraction end faces and a predetermined portion of one surface. The two anode terminals are formed on both the anode lead extraction end faces and peripheral portions thereof. The cathode terminal is formed on the cathode conductive layer exposed from said insulating sheathing resin layer.

6 Claims, 3 Drawing Sheets

CHIP TYPE SOLID ELECTROLYTIC CAPACITOR

BACKGROUND OF THE INVENTION

The present invention relates to a chip type solid electrolytic capacitor and, more particularly to the structure of a terminal.

As conventional chip type solid electrolytic capacitors, for example, there are a resin-molded capacitor and a simple resin-sheathed capacitor. In the resin-molded capacitor, external anode and cathode leads 12 and 13 are connected to both the terminals of a capacitor element 11 manufactured by the well-known technique as shown in FIG. 5, and an insulating sheathing resin layer 14 is formed by externally coating these leads 12 and 13 with a molding resin. In the simple resin-sheathed capacitor (FIG. 6), a capacitor element 11 is simply coated with an electrostatic powder resin 24 or the like to form an insulating sheathing resin layer 24, and external terminals 22 and 23 are directly connected to both the terminals of the capacitor electrode 11 without using anode and cathode leads.

In each of the conventional chip type solid electrolytic capacitors, the capacitor element 11 has rectifying characteristics. For this reason, when a chip is mounted on a printed wire board with its terminals being connected to erroneous polarities, a backward voltage is applied to the chip, and the following programs are posed. That is, breakdown occurs in the capacitor element 11, a large short-circuit current flows, and the temperature of the capacitor element 11 is increased to cause burnout of the capacitor element 11.

SUMMARY OF THE INVENTION

It is an object of the present invention to provide a chip type solid capacitor capable of preventing breakdown caused by erroneous polarity confirmation when a polarized capacitor chip is mounted on a printed board.

It is another object of the present invention to provide a chip type solid capacitor capable of improving its workability by omitting polarity confirmation of a polarized capacitor chip.

In order to achieve the above objects, according to the present invention, there is provided chip type solid electrolytic capacitor comprising a capacitor element obtained by sequentially forming an oxide film, a solid electrolytic layer, and a cathode conductive layer on an anode body consisting of a valve metal in which anode leads are extracted from two opposite end faces, an insulating sheathing resin layer coated on an entire outer surface except for both anode lead extraction end faces and a predetermined portion of one surface, two anode terminals formed on the both anode lead extraction end faces and peripheral portions thereof, and a cathode terminal formed the cathode conductive layer exposed from the insulating sheathing resin layer.

DESCRIPTION OF THE PREFERRED EMBODIMENTS

Figure 1:
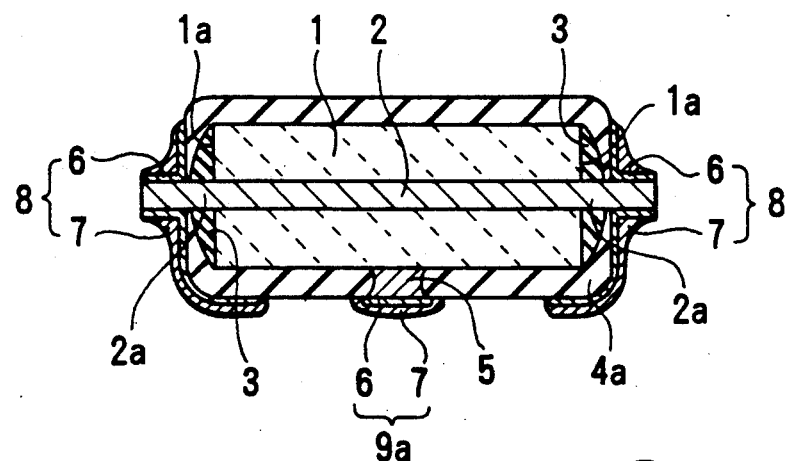
FIG. 1 is a sectional view showing a chip type solid electrolytic capacitor according to an embodiment of the present invention.
Figure 2:
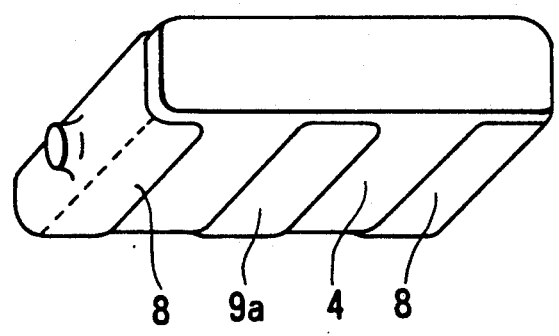
FIG. 2 is a perspective view showing the lower portion of the embodiment shown in FIG. 1 according to the present invention.

The present invention will be described below with reference to the accompanying drawings. FIG. 1 shows a chip type solid electrolytic capacitor according to an embodiment of the present invention, and FIG. 2 shows the lower portion of the chip type solid electrolytic capacitor shown in FIG. 1.

An oxide film and a solid electrolytic layer are sequentially formed on an anode body consisting of a valve metal in which anode leads 2 are extracted from the two opposite end faces (left and right end faces in FIG. 4) of the anode body, and a repellent resin layer 3 is formed on each of both anode lead proximal portions 2a of the anode body. Thereafter, in a capacitor element 1 on which a cathode conductive layer (not shown) is formed by the well-known technique, the upper end of the repellent resin layer 3 is removed by an cutting operation, the anode leads 2 and the center portion of one surface (lower surface in FIG. 1), on which a cathode terminal is formed, of the four remaining surfaces (upper, lower, front, and rear surfaces in FIG. 1) adjacent to anode lead extraction end faces 1a are masked, and electrostatic powder coating is performed on the resultant structure, thereby forming an insulating sheathing resin layer 4a on an entire outer surface of the element except for the masked portions.

A silver paste is baked ar 150° C. for 30 minutes on the cathode conductive layer of the capacitor element 1 which is exposed by the masking operation so as to form a conductive layer 5 having a thickness almost equal to the thickness of the insulating sheathing resin layer 4a. A butyl acetate solution containing palladium-amine compound is coated on the insulating sheathing resin layer 4a of the anode lead extraction end faces and the peripheral portions thereof and baked at 85° C. for 10 minutes, thereby depositing palladium serving as a metal catalyst to the anode portions.

Plating layers 6 are formed on the anode portions to which palladium is deposited and on the conductive layer 5 formed on the lower surface of the capacitor element 1, and a solder layer 7 is formed on each of the plating layers 6. The plating layer 6 and solder layer 7 on the conductive layer 5 are used as a rectangular cathode terminal 9a as shown in FIG. 2, and the anode leads 2 are cut to form anode terminals 8 each having a shape for covering an end face of the capacitor element 1, thereby arranging a chip type solid electrolytic capacitor.

Figure 3:
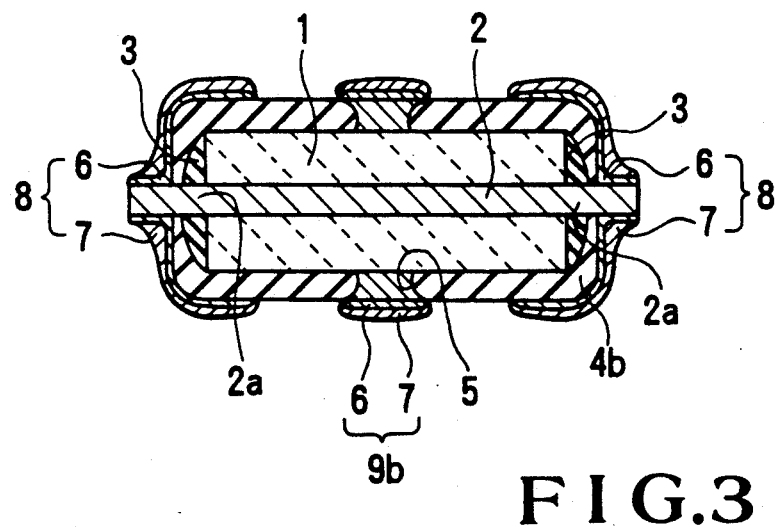
FIG. 3 is a sectional view showing a chip type solid electrolytic capacitor according to another embodiment of the present invention.
Figure 4:
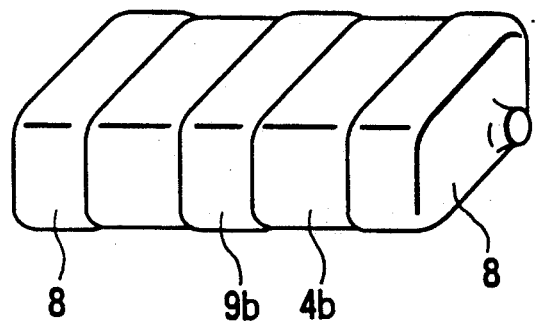
FIG. 4 is a perspective view showing the chip type solid electrolytic capacitor shown in FIG. 3 according to the present invention.
Figure 5:
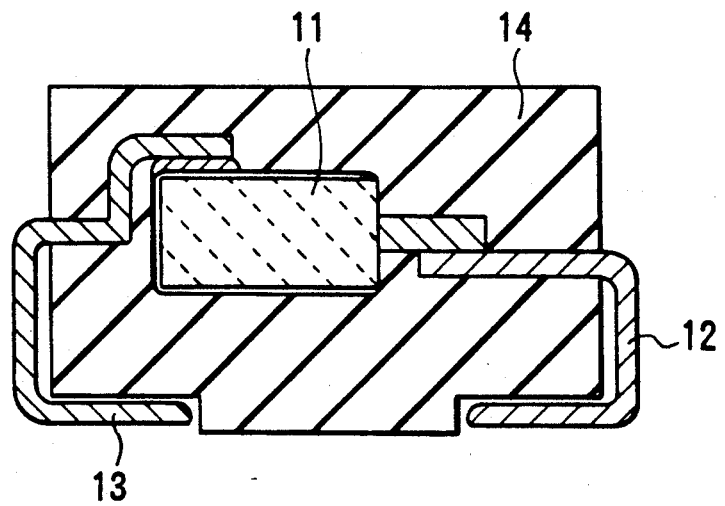
FIG. 5 is a sectional view showing a conventional chip type solid electrolytic capacitor.
Figure 6:
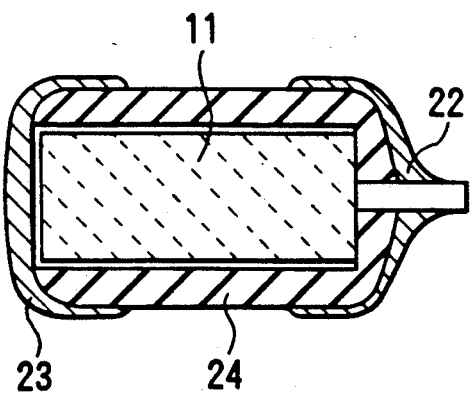
FIG. 6 is a sectional view showing another conventional chip type solid electrolytic capacitor.

FIG. 3 and 4 show a chip type solid electrolytic capacitor according to another embodiment of the present invention.

In a capacitor element 1 formed following the same procedures as in FIG. 1, the upper end of a repellent resin layer 3 is removed by a cutting operation, and anode leads 2 and a ribbon-like central portion extending through the four surfaces adjacent to anode lead extraction end faces are entirely masked, and electrostatic powder coating is applied to the resultant structure to form an insulating sheathing resin layer 4b on an entire outer surface of the element except for the masked portions.

A silver paste is baked at 150° C. for 30 minutes on the exposed cathode conductive layer of the capacitor element 1 to form a conductive layer 5 having a thickness almost equal to the thickness of an insulating sheathing resin layer 4a, and a butyl acetate solution containing palladium-amine compound is coated on the insulating sheathing resin layer 4a of each of the anode lead extraction end faces and on a peripheral portions thereof and baked at 185° C. for 10 minutes, thereby attaching palladium serving as a metal catalyst to anode portions.

Plating layers 6 are simultaneously formed on the anode portions to which palladium is deposited and on the conductive layer 5 formed on the capacitor element 1, and a solder layer 7 is formed on each of the plating layers 6. A ring-like cathode terminal 9b is formed by the plating layer 6 and the solder layer 7 on the conductive layer 5 as shown in FIG. 4, and the anode leads 2 are cut to form anode terminals 8, thereby arranging a chip type solid electrolytic capacitor.

In this embodiment, since the cathode terminal 9b is formed on the entire outer surface of the chip, any one of the four surfaces adjacent to the anode lead extraction end faces can be used as a surface to be mounted on a printed board.

As described above, in a chip type solid electrolytic capacitor according to the present invention, a cathode terminal is formed on the central portion of a chip, and two anode terminals are formed on both the ends of the chip. For this reason, the chip type solid electrolytic capacitor is symmetrical, and polarities of the capacitor do not depend on the direction of the chip. Therefore, the following accident can be prevented. That is, the chip is mounted on a printed board with its terminals being connected to erroneous polarities, and the capacitor has failed by being applied with a backward voltage.

In addition, since a cathode terminal is formed on the entire outer surface of the chip, any one of four surfaces adjacent to anode lead extraction end faces can be used as a surface to be mounted on the printed board.

What is claimed is:

1. A chip type solid electrolytic capacitor comprising:
   a capacitor element obtained by sequentially forming an oxide film, a solid electrolytic layer, and a cathode conductive layer on an anode body consisting of a valve metal in which anode leads are extracted from two opposite end faces;
   an insulating sheathing resin layer coated on an entire outer surface except for both anode lead extraction end faces and a predetermined portion of one surface;
   two anode terminals formed on said both anode lead extraction end faces and peripheral portions thereof; and
   a cathode terminal formed said cathode conductive layer exposed from said insulating sheathing resin layer.

2. A capacitor according to claim 1, wherein said both anode leads consist of a continuous common lead extending through said capacitor element.

3. A capacitor according to claim 1, wherein said cathode terminal is formed on a central portion of at least one surface of said capacitor element to have a rectangular shape.

4. A capacitor according to claim 1, further comprising a resin layer coated on said entire outer surface of said capacitor element except for a predetermined portion extending over four surfaces adjacent to said both anode lead extraction end faces as said insulating sheathing resin layer, and a ring-like terminal formed on said cathode conductive layer exposed from said insulating sheathing resin layer as said cathode terminal.

5. A capacitor according to claim 1, wherein said cathode terminal consists of a plating layer and a solder layer which are sequentially formed on a conductive layer to have a thickness almost equal to a thickness of said insulating sheathing resin layer.

6. A capacitor according to claim 1, wherein said insulating sheathing resin layer is formed on said entire outer surface of said capacitor element after the predetermined portion of said capacitor element and both said anode leads are masked.

* * * * *